(12) United States Patent  
Gonion et al.

(10) Patent No.: US 8,402,255 B2  
(45) Date of Patent: *Mar. 19, 2013

(54) MEMORY-HAZARD DETECTION AND AVOIDANCE INSTRUCTIONS FOR VECTOR PROCESSING

(75) Inventors: Jeffry E. Gonion, Sunnyvale, CA (US); Keith E. Diefendorff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,170

(22) Filed: Sep. 1, 2011

(65) Prior Publication Data

US 2011/0320883 A1     Dec. 29, 2011

Related U.S. Application Data

(63) Continuation of application No. 11/803,576, filed on May 14, 2007, now Pat. No. 8,019,976.

(51) Int. Cl.
    *G06F 9/30* (2006.01)
(52) U.S. Cl. ....................................................... 712/225
(58) Field of Classification Search .................. None
    See application file for complete search history.

(56) References Cited

U.S. PATENT DOCUMENTS

| | | | |
|---|---|---|---|
| 5,381,536 A | 1/1995 | Phelps | |
| 5,781,752 A | 7/1998 | Moshovos | |
| 5,953,241 A | 9/1999 | Hansen | |
| 6,115,808 A | 9/2000 | Arora | |
| 6,295,599 B1 | 9/2001 | Hansen | |
| 6,308,250 B1 | 10/2001 | Klausler | |
| 6,584,482 B1 | 6/2003 | Hansen | |
| 6,643,765 B1 | 11/2003 | Hansen | |
| 6,725,356 B2 | 4/2004 | Hansen | |
| 7,213,131 B2 | 5/2007 | Hansen | |
| 7,216,217 B2 | 5/2007 | Hansen | |
| 7,260,708 B2 | 8/2007 | Hansen | |
| 7,301,541 B2 | 11/2007 | Hansen | |
| 7,353,367 B2 | 4/2008 | Hansen | |
| 7,430,655 B2 | 9/2008 | Hansen | |
| 7,464,252 B2 | 12/2008 | Hansen | |
| 7,509,366 B2 | 3/2009 | Hansen | |
| 7,516,308 B2 | 4/2009 | Hansen | |
| 7,653,806 B2 | 1/2010 | Hansen | |
| 7,660,972 B2 | 2/2010 | Hansen | |
| 7,660,973 B2 | 2/2010 | Hansen | |
| 7,730,287 B2 | 6/2010 | Hansen | |

*Primary Examiner* — Robert Fennema  
(74) *Attorney, Agent, or Firm* — Park, Vaughan, Fleming & Dowler LLP; Anthony Jones

(57) ABSTRACT

A processor that is configured to perform parallel operations in a computer system where one or more memory hazards may be present is described. An instruction fetch unit within the processor is configured to fetch instructions for detecting one or more critical memory hazards between memory addresses if memory operations are performed in parallel on multiple addresses corresponding to at least a partial vector of addresses. Note that critical memory hazards include memory hazards that lead to different results when the memory addresses are processed in parallel than when the memory addresses are processed sequentially. Furthermore, an execution unit within the processor is configured to execute the instructions for detecting the one or more critical memory hazards.

24 Claims, 8 Drawing Sheets

```
                                                                    ─ 200
```

┌─────────────────────────────────────────────────────────────────────┐
│ DETECT ONE OR MORE CRITICAL MEMORY HAZARDS BETWEEN MEMORY           │
│ ADDRESSES IF THE MEMORY OPERATIONS ARE PERFORMED IN PARALLEL ON     │
│ MULTIPLE ADDRESSES CORRESPONDING TO AT LEAST A PARTIAL VECTOR OF    │
│ ADDRESSES, WHERE CRITICAL MEMORY HAZARDS INCLUDE MEMORY             │
│ HAZARDS THAT LEAD TO DIFFERENT RESULTS WHEN THE MEMORY              │
│ ADDRESSES ARE PROCESSED IN PARALLEL THAN WHEN THE MEMORY            │
│ ADDRESSES ARE PROCESSED SEQUENTIALLY                                │
│ 210                                                                 │
└─────────────────────────────────────────────────────────────────────┘
                                    ↓
┌─────────────────────────────────────────────────────────────────────┐
│ CALCULATE THE POSITION AND PRESENCE OR ABSENCE OF AT LEAST A FIRST  │
│ STOP INDICATOR THAT IDENTIFIES THE ONE OR MORE CRITICAL MEMORY      │
│ HAZARDS                                                             │
│ 212                                                                 │
└─────────────────────────────────────────────────────────────────────┘
                                    ↓
┌─────────────────────────────────────────────────────────────────────┐
│ GENERATE PREDICATE VALUES WHICH SPECIFY THE ELEMENTS FOR WHICH      │
│ OPERATIONS MAY SAFELY BE PERFORMED IN PARALLEL FOR A FIRST SET OF   │
│ CONSECUTIVE ELEMENTS IN AT LEAST THE PARTIAL VECTOR, WHERE THE      │
│ OPERATIONS INCLUDE THE MEORY OPERATIONS AND THE FIRST SET OF        │
│ CONSECUTIVE ELEMENTS IS DETERMINED BASED ON THE FIRST STOP          │
│ INDICATOR                                                           │
│ 214                                                                 │
└─────────────────────────────────────────────────────────────────────┘
                                    ↓
┌─────────────────────────────────────────────────────────────────────┐
│ DISTRIBUTE AT LEAST THE PARTIAL VECTOR FOR PROCESSING BY ONE OR     │
│ MORE PROCESSORS AND/OR PROCESSOR CORES BASED ON THE PREDICATE       │
│ VALUES                                                              │
│ (OPTIONAL)                                                          │
│ 216                                                                 │
└─────────────────────────────────────────────────────────────────────┘

FIG. 2

EXIT CONDITIONS

P = 0 | 0 | 0 | 0 | 0 | 0 | 0 | 0 | 0 |

P = CheckHazard(P, A, B) | 0 | 0 | 0 | 0 | 0 | 1 | 0 | 0 |  1st Instruction

P = CheckHazard(P, B, C) | 0 | 0 | 0 | 0 | 0 | 1 | 0 | 0 |  2nd Instruction

P = CheckHazard(P, A, C) | 0 | 0 | 1 | 0 | 0 | 1 | 0 | 0 |  3rd Instruction

FIG. 9

ENTRY CONDITIONS

B | 0 | 1 | 2 | 3 | 4 | 5 | 6 | 7 |  Indices of A[] to be read

C | 0 | 3 | 4 | 5 | 6 | 1 | 5 | 9 |  Indices of A[] to be written

P | 0 | 0 | 0 | 0 | 0 | 0 | 0 | 0 |  Initially an empty vector

EXIT CONDITIONS

P = CheckHazardGen(P, B, C) | 1 | 1 | 1 | 0 | 0 | 0 | 0 | 0 |

P = CheckHazardGen(P, B, C) | 0 | 0 | 0 | 1 | 1 | 0 | 0 | 0 |

P = CheckHazardGen(P, B, C) | 0 | 0 | 0 | 0 | 0 | 1 | 1 | 1 |

P = CheckHazardGen(P, B, C) | 0 | 0 | 0 | 0 | 0 | 0 | 0 | 0 |

FIG. 10

MEMORY-HAZARD DETECTION AND AVOIDANCE INSTRUCTIONS FOR VECTOR PROCESSING

RELATED APPLICATION

The present patent is a continuation of, and hereby claims priority under 35 U.S.C §120 to, pending U.S. patent application Ser. No. 11/803,576, entitled "Memory-Hazard Detection and Avoidance Instructions for Vector Processing," by inventors Jeffry E. Gonion and Keith E. Diefendorff, filed on 14 May 2007.

BACKGROUND

1. Field of the Invention

The present invention relates to techniques for improving computer system performance. More specifically, the present invention relates to anti-memory-hazard instructions for use in vector or parallel processing.

2. Related Art

There are many impediments to the parallelization of computational operations in parallel processing systems. Among these impediments, one of the more difficult problems to address is memory hazards, such as address hazards, in which different memory references refer to the same address. The potential for memory hazards often restricts exploitation of many features available in modern high-performance processors. For example, memory hazards may block instruction-level parallelism (ILP) by preventing load instructions from being hoisted above store instructions. Furthermore, memory hazards may block data-level parallelism (DLP) by preventing compilers from vectorizing loops, or may block thread-level parallelism by preventing threads from being spawned.

In the case of ILP, existing processors typically attempt to move loads upward in the instruction stream with the goal of initiating memory transactions as early as possible while the processor performs other work in parallel. For example, out-of-order processors often use hardware mechanisms to hoist loads. All such processors implement some form of dynamic (runtime) memory disambiguation in hardware, for example, by using a memory order buffer (MOB) to prevent a computer from erroneously moving a load ahead of a preceding store that turns out to be directed to the same address.

In contrast, in-order processors use a compiler to explicitly hoist loads. However, these compilers operate without the benefit of runtime information and, therefore, cannot always predetermine if moving a load ahead of a store will be safe. This uncertainty forces these compilers to be conservative in hoisting loads which greatly sacrifices performance. This also greatly limits performance in superscalar in-order computers, such as those that implement very-long-instruction-word (VLIW) architectures. To address this problem, some of these computers include hardware mechanisms that enable their compilers to more aggressively hoist loads. In particular, these mechanisms enable the compiler to speculatively hoist a load by providing a hardware-checking mechanism which either verifies at runtime that the movement of a load was legitimate or which generates an exception after a memory-hazard problem is encountered to allow software to repair the problem.

In the case of DLP, existing autovectorizing compilers cannot freely vectorize code for exactly the same memory-hazard-related reasons that scalar and superscalar processors cannot freely reorder loads and stores. In particular, aggregating a set of temporally sequential operations (such as loop iterations) into a spatially parallel vector creates essentially the same problem as reordering the loads and stores. In either case, the sequential semantics of the program are potentially violated. Just as compilers cannot always predetermine when it is safe to reorder loads above stores, a vectorizing compiler cannot predetermine when it is safe to group sequential operations into a parallel vector of operations. However, in the case of vector processors the ramifications are more than a mere incremental performance loss. The entire advantage behind vector processing is defeated. Consequently, vector processors are rarely built and those with short-vector facilities, such as Single-Instruction-Multiple-Data (SIMD) processors, are often underutilized. The underlying problem for these processors is that existing compilers are severely limited in their ability to automatically vectorize code due to their inability to statically disambiguate memory references.

Similarly, in the case of thread-level parallelism existing multithreading compilers are often prevented from spawning multiple parallel threads due to the potential for memory hazards. This limitation may not be a large problem for existing multi-core and multithreaded processors because they currently operate using coarse-grain threads and depend upon explicit parallelization by human programmers. Unfortunately, it is difficult to scale these manual parallelization techniques. Consequently, to facilitate fine-grain multithread processor architectures (in which each iteration of a loop may be processed by a different processor or core), compilers will need to overcome memory-address-hazard problems to automatically parallelize programs.

Hence what is needed is a technique to facilitate vector or parallel processing in the presence of memory hazards without the above-described problems.

SUMMARY

One embodiment of the present invention provides a processor that is configured to perform parallel operations in a computer system where one or more memory hazards may be present. An instruction fetch unit within the processor is configured to fetch instructions for detecting one or more critical memory hazards between memory addresses if memory operations are performed in parallel on multiple addresses corresponding to at least a partial vector of addresses. Note that critical memory hazards include memory hazards that lead to different results when the memory addresses are processed in parallel than when the memory addresses are processed sequentially. Furthermore, an execution unit within the processor is configured to execute the instructions for detecting the one or more critical memory hazards.

In some embodiments, detecting of the one or more critical memory hazards includes calculating the position and presence or absence of at least a first stop indicator that identifies the one or more critical memory hazards.

In some embodiments, the instruction fetch unit is configured to fetch instructions for generating predicate values which specify the elements for which operations may safely be performed in parallel for a first set of consecutive elements in at least the partial vector. Note that the operations include the memory operations, and the first set of consecutive elements is determined based on the first stop indicator. Furthermore, the first set of consecutive elements includes elements up to the first stop indicator or up to but excluding the first stop indicator.

In some embodiments, the operations are to be performed in a loop, and the predicate values are used to mask elements in at least the partial vector thereby allowing elements in the first set of consecutive elements to be processed in parallel.

Moreover, the loop may be iterated after the first set of consecutive elements has been processed if the predicate values did not encompass all of the elements in at least the partial vector. Therefore, in some embodiments the generating of predicates is repeated for additional stop indicators until at least the entire partial vector has been processed.

In some embodiments, detecting the one or more critical memory hazards includes locating specific elements of the vector which exhibit one or more critical memory hazards.

In some embodiments, the detecting of the one or more critical memory hazards includes determining a second stop indicator that identifies at least a portion of the one or more critical memory hazards. Furthermore, a second set of continuous elements, which is based in part on the second stop indicator, may have a different size than the first set of continuous elements.

In some embodiments, the parallel processing is to be performed by multiple processors and/or includes multiple threads that are to be executed by multiple cores. Moreover, the processing may include vector processing of data in at least the partial vector.

In some embodiments, the operations include a first operation followed by a second operation. Note that the first operation may be a write operation or a read operation, and the second operation may be a write operation or a read operation. Furthermore, the first operation may be on a scalar or at least the partial vector, and the second operation may be on a scalar or at least the partial vector. In some embodiments, at least one of the first operation and the second operation is a multi-element operation.

In some embodiments, at least the partial vector includes a full vector.

Another embodiment of the invention provides the computer system that includes a memory and the processor. This computer system is configured to execute the instructions for detecting and locating the one or more critical memory hazards and/or for generating the predicate values.

Another embodiment of the invention provides a compiler configured to generate instructions based on a feature set of the processor. This processor is configured to detect and locate the one or more critical memory hazards and/or to generate the predicate values.

Another embodiment of the invention provides a method for performing parallel operations in the computer system where one or more memory hazards may be present. During this method, the instructions for detecting and locating the one or more critical memory hazards are received and executed.

BRIEF DESCRIPTION OF THE FIGURES

FIG. 2 is a flow chart illustrating a process for performing parallel operations in a computer system where one or more memory hazards may be present in accordance with an embodiment of the present invention.

FIG. 9 illustrates the determination of stop indicators in accordance with an embodiment of the present invention.

FIG. 10 illustrates the determination of stop indicators in accordance with an embodiment of the present invention.

Figure 1A:
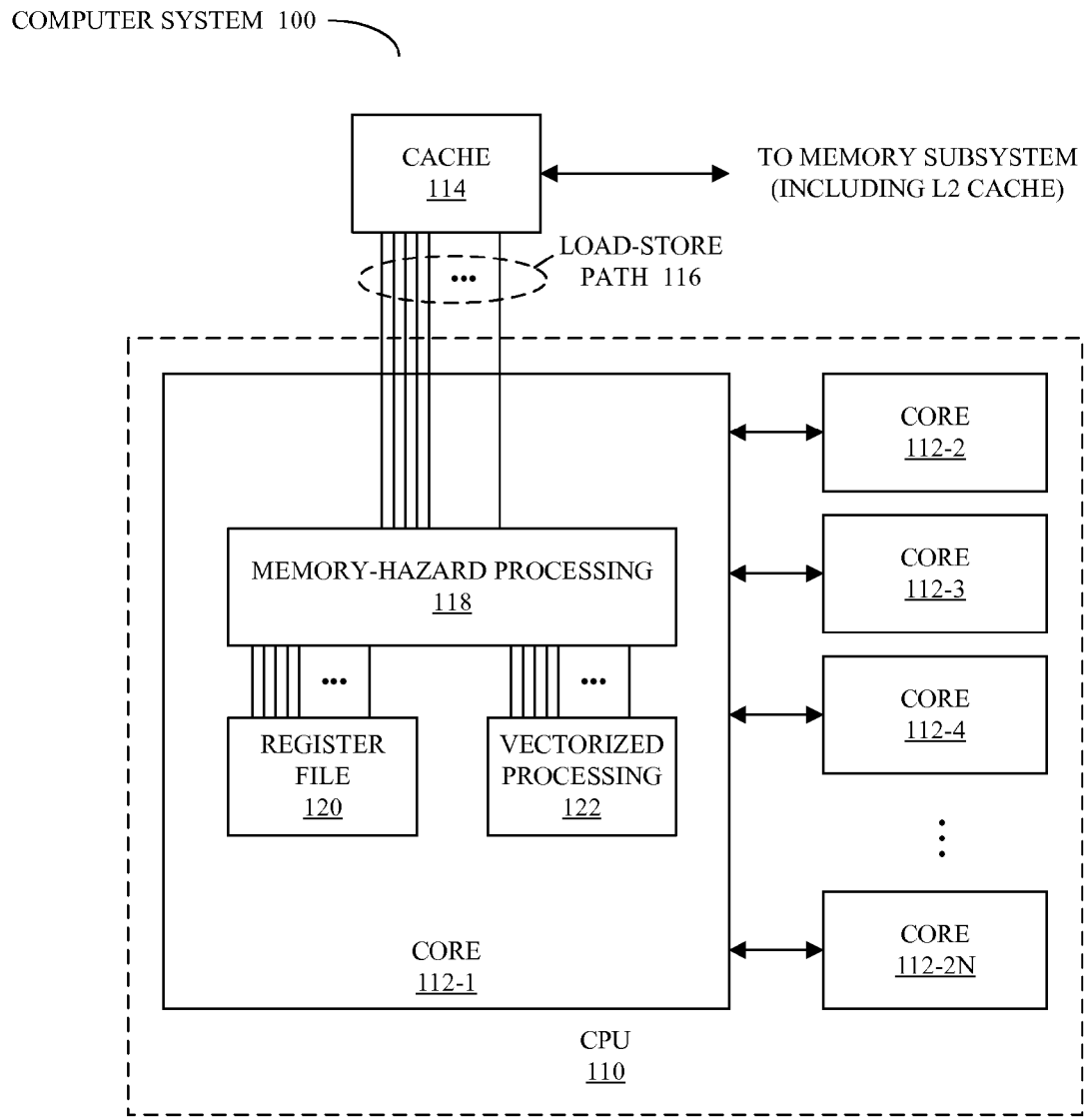
FIG. 1A is a block diagram illustrating a computer system in accordance with an embodiment of the present invention.

Table 1 provides pseudo-code in accordance with an embodiment of the present invention.

Table 2 provides pseudo-code in accordance with an embodiment of the present invention.

Table 3 provides pseudo-code in accordance with an embodiment of the present invention.

Table 4 provides pseudo-code in accordance with an embodiment of the present invention.

Table 5 provides pseudo-code in accordance with an embodiment of the present invention.

Table 6 provides pseudo-code in accordance with an embodiment of the present invention.

Table 7 provides pseudo-code in accordance with an embodiment of the present invention.

Table 8 provides pseudo-code in accordance with an embodiment of the present invention.

Table 9 provides pseudo-code in accordance with an embodiment of the present invention.

Table 10 provides pseudo-code in accordance with an embodiment of the present invention.

Table 11 provides pseudo-code in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Embodiments of a processor, a computer system, a compiler, and a technique that facilitate parallel or vector processing in the presence of memory hazards. In particular, these devices, systems, and/or techniques may be used to mitigate or cope with the effects of memory hazards (when present) in a variety of environments, including: data-level-parallelism (DLP) machines, autovectorizing compilers, fine-grain threaded processors, and/or autothreading compilers. (With respect to parallelization of operations, note that memory hazards include multiple references to the same memory location that may potentially occur in a different order when operations are executed in parallel than they would when operations are performed sequentially.) These techniques may be applied in macroscalar-class processors or microprocessors (which allow multiple iterations of a loop to execute in parallel, where the degree of parallelization is determined at run-time) and/or vector-style macroscalar processors or microprocessors (in which the effective vector length is changed dynamically, either by means of a variable vector length, or through predication of operations on certain elements of the vector).

In some embodiments, the technique involves detecting and locating so-called critical memory hazards which have the potential to cause different results when memory addresses (corresponding to scalars, partial vectors, and/or vectors) are accessed in parallel than when the memory addresses are accessed sequentially. Note that elements of the scalars, partial vectors, and/or vectors may include: one or more bits, one or more bytes, and/or one or more words (which each include N bits). Furthermore, note that the memory addresses that critical memory-hazard detection may be applied to include: actual addresses, array indexes, or any other surrogate of memory addresses (such as memory pointers).

Once a critical memory hazard has been located, predicate vectors are produced that a processor can use to specify the elements for which operations (including the memory operations) may safely be performed in parallel for one or more sets of consecutive elements in a partial vector or a full vector. For example, the operations may be performed in a loop, and the predicate values may be used to mask elements in the partial vector or the full vector thereby allowing elements in the one or more sets of consecutive elements to be processed in parallel. In this way, incorrect behavior due to actual memory hazards can be avoiding thereby facilitating parallel processing.

By providing mechanisms to guarantee correct program execution in the presence of possible memory hazards, and by using the techniques described below, processors, microprocessors, and/or autovectorizing compilers may be better able to use code optimization techniques (such as parallel or vector processing) even in the presence of dynamic program behavior.

Note that the data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), and/or other media capable of storing computer-readable media now known or later developed.

We now describe embodiments of a computer system that includes one or more processors. FIG. 1A presents a block diagram illustrating a computer system 100 in accordance with an embodiment of the present invention. Computer system 100 may generally include any type of computer system, including, but not limited to: a computer system based on a processor or microprocessor, a mainframe computer, a digital signal processor, a portable computing device, a personal organizer, a device controller, a cell phone, and/or a computational engine within an appliance.

Computer system 100 includes a central-processing unit (CPU) 110 which performs computational operations. While performing these computational operations, CPU 110 operates on data items retrieved from cache memory 114 via a load-store path 116. Note that cache memory 114 is coupled to a memory subsystem (not illustrated). In one embodiment of the present invention, cache memory 114 is a Level-One (L1) data cache which communicates with a memory subsystem that includes a Level-Two (L2) unified instruction/data cache and a main memory.

CPU 110 includes multiple cores 112. One or more of these cores 112 includes memory-hazard processing module 118 (for example, in an execution unit), which executes instructions for detecting critical memory hazards (which are referred to as CheckHazard instructions) and determining one or more stop indicators during the processing of vectors or portions of vectors, such as a partial vector. Note that if a critical memory hazard is detected a minimum number of stop indicators are calculated (where a given stop indicator may include one or more bits). Furthermore, the presence of a memory hazard may be detected when software is compiled and/or at runtime when the associated code is executed. And in some embodiments stop indicators may be identified for multiple vectors or portions of vectors concurrently or independently of one another.

Memory-hazard processing module 118 may also execute instructions for generating predicate vectors (which are referred to as GeneratePredicates instructions) for vectors or partial vectors based on the stop indicators. These instructions define how to partition the vector or the partial vector. For example, one or more sets of continuous elements in the vectors or partial vectors may be processed in parallel based on the predicate values. Note that a register file 120 may hold the stop indicators, the associated predicate vectors, and operands that are to be processed by functional units within the CPU 110 and/or core 112-1.

Figure 1B:
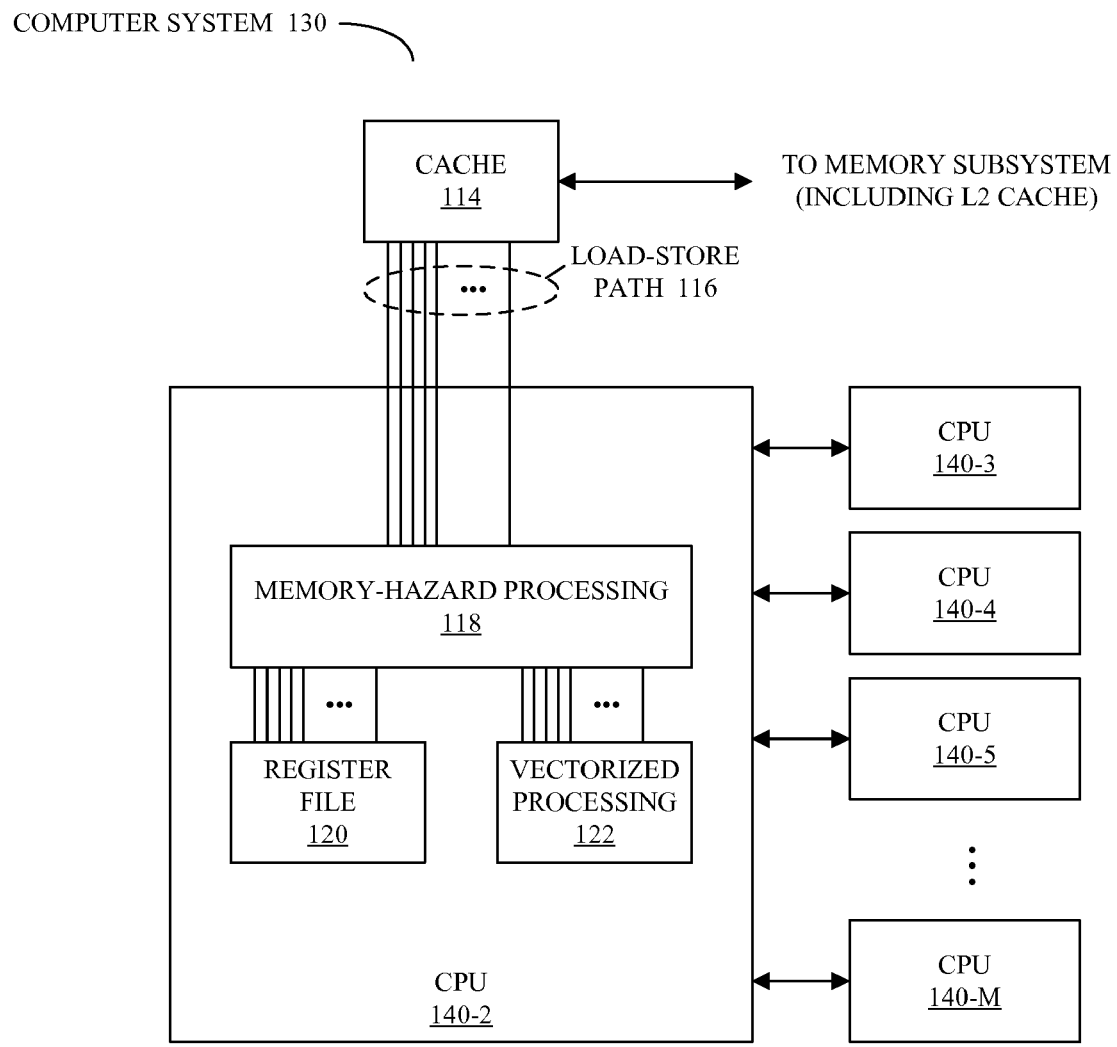
FIG. 1B is a block diagram illustrating a computer system in accordance with an embodiment of the present invention.

Furthermore, vector processing module 122 may assign portions of the vector or partial vector to one or more of the cores 112 for processing. In some embodiments, this processing is implemented using multiple CPUs. This is illustrated in FIG. 1B, which presents a computer system 130 that includes CPUs 140 in accordance with an embodiment of the present invention.

Note that while the computer system 100 (FIG. 1A) and/or the computer system 130 are illustrated as having a number of components in a given configuration, in other embodiments the computer system 100 (FIG. 1A) and/or the computer system 130 include fewer components or additional components, two or more components are combined into a single component, and/or a position of one or more components is be changed. For example, in some embodiments the techniques described below are implemented within existing modules in CPU 110 (FIG. 1A) and/or CPU 140.

We now describe embodiments of a method for performing parallel operations in the computer system when one or more memory hazards are present. FIG. 2 is a flow chart illustrating a process 200 for performing parallel operations in a computer system when one or more memory hazards are present in accordance with an embodiment of the present invention. During this process, CheckHazard instructions are used to detect one or more critical memory hazards between memory addresses if memory operations are performed in parallel on multiple addresses corresponding to at least a partial vector of addresses (210). Note that critical memory hazards include memory hazards that lead to different results when the memory addresses are processed in parallel than when the memory address are processed sequentially. Furthermore, CheckHazard instructions are used to calculate the position and presence or absence of at least a first stop indicator that identifies the one or more critical memory hazards (212).

Then, GeneratePredicates instructions are used to generate predicate values which specify the elements for which operations may safely be performed in parallel for a first set of consecutive elements in at least the partial vector (214). Note that the operations include the memory operations, and the first set of consecutive elements is determined based on the first stop indicator. Next, at least the partial vector is optionally distributed for processing by one or more execution units, processors and/or processor cores based on the predicate values (216).

Note that in some embodiments of the process 200: there may be additional or fewer operations; the order of the operations may be changed; and/or two or more operations may be combined into a single operation.

We now describe embodiments that detect critical memory hazards and generate predicates. CheckHazard instructions compare two items (such as two vectors, two partial vectors, or combinations of scalars, vectors, and partial vectors) containing memory addresses, indexes, and/or other addressing-related information to detect if there are one or more critical memory hazards between memory items referenced by the elements of each item. In the discussion that follows, vectors are used as illustrative examples of items. Note that these items may be located in processor registers or in memory. Also note that critical memory hazards include memory hazards that could produce incorrect program behavior if the memory indicated by a first vector was read or written before the memory indicated by a second vector is read or written.

CheckHazardVR instructions detect critical memory hazards for read-before-write, write-before-read, and write-before-write code sequences or operations. Note that memory hazards in read-before-read code sequences are never critical, so it need not be checked. In the discussion that follows, CheckHazard instructions for handling read-before-write and write-before-read code sequences using two vectors are referred to as CheckHazardVR instructions.

Consider the operation of the loop presented in Table 1. The loop in this example cannot be vectorized because of potential memory hazards between elements of A. Note that a CheckHazardVR instruction detects the memory hazards and supplies information to allow vectorized code to be executed safely. Because of this guarantee, the compiler is able to generate vectorized code for loops for which it would normally be unsafe to do so. In particular, autovectorization causes the indexes into A contained in B and C to be placed into two vector registers. Then, the CheckHazardVR instruction detects where the vector must be broken into sub-vectors (i.e., the location of stop indicators) to ensure correct program behavior during parallel processing. Note that the definition of elements in the vectors that are to be processed concurrently is based on predicate values generated from these stop indicators.

Figure 3:
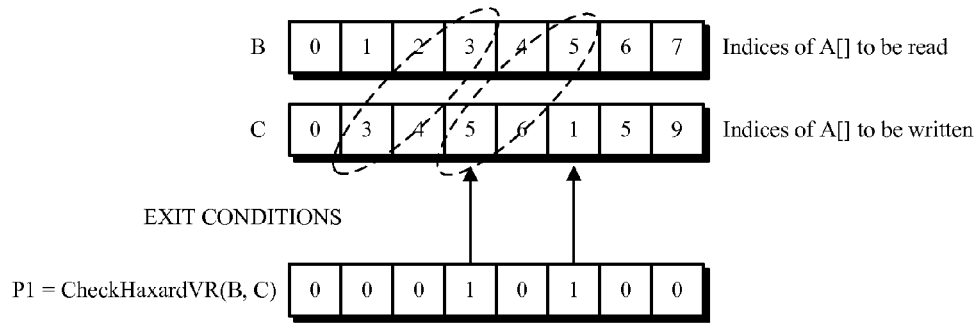
FIG. 3 illustrates the determination of stop indicators in accordance with an embodiment of the present invention.

TABLE 1 for (x=0; x<100; ++x)
    A[C[x]] = A[B[x]] + 1;

This is illustrated in FIG. 3, which presents the determination of stop indicators using CheckHazard instructions in accordance with an embodiment of the present invention. Note that an element of a vector corresponds to the value of a scalar, and time (iterations) increase going from left to right in vectors B and C, and memory-hazard conditions are illustrated by dashed ellipses. Furthermore, for a write operation followed by a read operation, the stop indicator at position or element 4 in iteration-control vector P1 covers memory hazards for the '3' and the '4' indices, and the stop indicator at position or element 6 in P1 covers memory hazards for the '5' and the '6' indices in vectors B and C. These positions in vectors B and C corresponding to the stop indicator in P1 are illustrated by the vertical arrows in FIG. 3.

Figure 4:
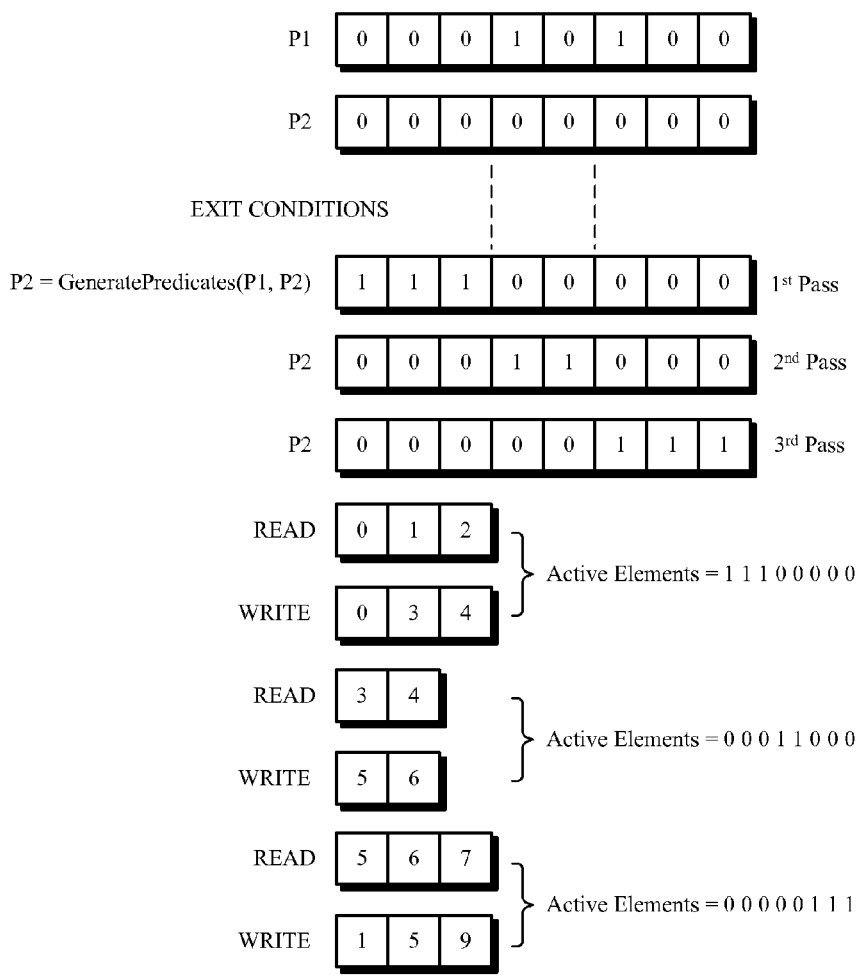
FIG. 4 illustrates the generation of predicates in accordance with an embodiment of the present invention.

Note that P1 identifies which loop iterations cannot be run in parallel with preceding loop iterations, and thus determines boundaries that can be used for piecewise iteration of these sub-vectors over a full vector. Although P1 may be a predicate vector, in some embodiments it is not used directly for predication of individual elements. Instead, P1 may be used to generate predicate vectors, such as P2. This is illustrated in FIG. 4, which presents the generation of predicates using GeneratePredicates instructions in accordance with an embodiment of the present invention.

In particular, P2 indicates the elements to be processed to implement the piecewise processing of a single vector. As illustrated in FIG. 4, P2 may be determined iteratively, where as many vector elements are included as possible (until the next stop indicator in P1), and this process is repeated in subsequent iterations until all of the elements in the vector are included. This technique allows the code to achieve the greatest amount of parallelism possible for the given memory-hazard conditions.

In this example, breaking the vector before the first set stop indicator changes the criticality of the remaining memory-hazard elements. Note that while there appears to be a critical memory hazard between the read and write of elements A[4] and A[6], stop indicators are only set for elements A[3] and A[5]. This is because once parallelization is broken before element A[3] is read, then the memory hazard of element A[4] becomes benign because it lies in the shadow of the break in parallelism caused by the memory hazard on element A[3]. Note that this also applies for A[6] living in the shadow of A[5].

Table 2 presents pseudo-code that illustrates the operation of CheckHazardVR instructions in accordance with an embodiment of the present invention. Note that this pseudo-code determines matches between elements in two vectors and where the memory hazard(s) occurs. Also note that because a critical memory hazard never exists in the first element in a given vector, it can be set to either polarity because it has no effect on how the vector is broken into sub-vectors.

TABLE 2 for (x=0; x<VECLEN; ++x)
    P[x] = 0;
for (z=0; z<VECLEN-1; z=pos)
{
    pos = VECLEN;
    for (y=z; y<VECLEN-1; ++y)
    {
        for (x=y+1; x<VECLEN; ++x)
        {
            if (Vb[y] == Va[x])
                if (x < pos)
                    pos = x;
        }
    }
    if (pos < VECLEN)
        P[pos] = 1;
}

Note that the preceding example applies to byte-wide memory accesses. For larger memory accesses, additional logic may be used to detect memory references that partially overlap. However, this may not be necessary in processors or microprocessors that only support naturally-aligned memory access.

While write-before-write memory hazards can be correctly handled using CheckHazardVR instructions, there are additional optimizations that may be employed in write-write situations. In the discussion that follows, CheckHazard instructions for write-before-write operations using two vectors is referred to as CheckHazardVW instructions. Note that a CheckHazardVW instruction compares two vectors to determine if there are one or more critical memory hazards between memory items referenced by the elements of each vector in the case that both vectors represent memory references that are to be written to.

Figure 5:
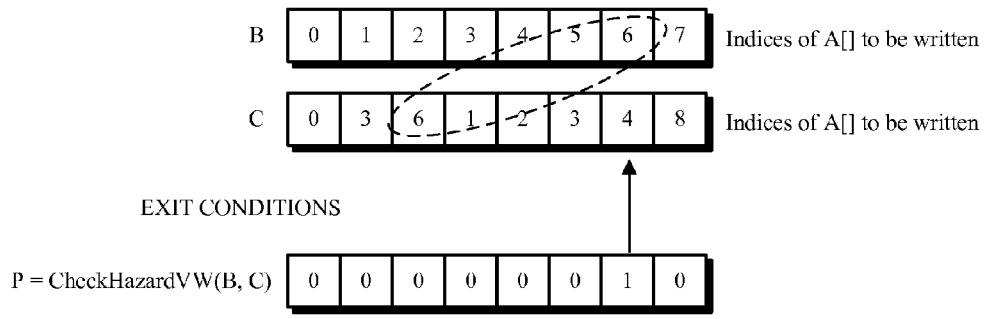
FIG. 5 illustrates the determination of stop indicators in accordance with an embodiment of the present invention.

Consider the operations in the loop presented in Table 3 and the associated determination of stop indicators presented in FIG. 5. Note that the entry conditions show memory hazards on elements A[3] and A[6]. However, because element A[3] is written twice (via C[ ]) only the final write of element A[3] is important (there are no reads of A[ ] in this loop). Therefore, the memory hazard on element A[3] is benign, while the memory hazard on element A[6] is critical.

TABLE 3

```
for (x=0; x<100; ++x)
{
    A[B[x]] = x;
    A[C[x]] = -x;
}
```

In some embodiments, programmatically correct intermediate states are constructed. These intermediate states represent the state of memory at some loop mid-vector iteration. Examples include cases where A[ ] is read in the loop, or an external function is conditionally called within the loop. In such cases, the compiler may revert to the CheckHazardVR instruction to guarantee correct intermediate states.

Memory-hazard checking may also be performed between a scalar storage address and a vector of storage addresses (which are implemented using CheckHazardS instructions). Note that a CheckHazardS instruction compares a scalar and a vector containing memory addresses, indexes, and/or other addressing-related information to determine if there are one or more critical memory hazards between memory items referenced by the scalar and the vector. Results of the CheckHazardSV and CheckHazardVS instructions are equivalent to replicating the scalar across all elements of a vector, and performing the CheckHazardVR operation on the two resulting vectors.

Figure 6:
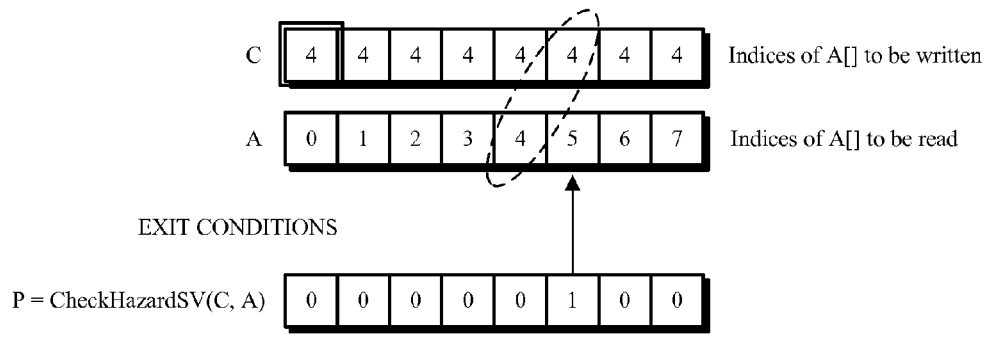
FIG. 6 illustrates the determination of stop indicators in accordance with an embodiment of the present invention.

Consider the operations in the loop presented in Table 4 and the associated determination of stop indicators presented in FIG. 6. Here we ignore possible memory hazards on B[ ] (at least for a moment), and first determine whether any element of A[ ] has a memory hazard with the scalar pointer C. Note that the stop indicator occurs such that the last write still results in a correct read.

TABLE 4

```
for (x=0; x<100; ++x)
{
    *C = x + 1;
    B[x] = A[x] + 1;
}
```

Figure 7:
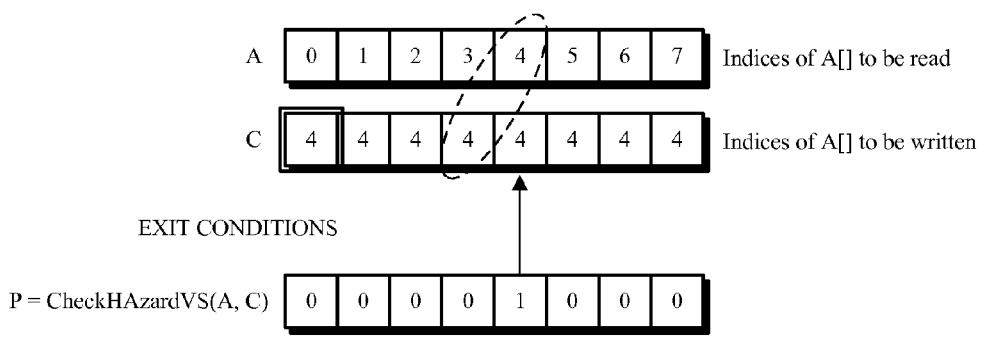
FIG. 7 illustrates the determination of stop indicators in accordance with an embodiment of the present invention.

Another example of operations in a loop is presented in Table 5 and the associated determination of stop indicators is presented in FIG. 7.

TABLE 5

```
for (x=0; x<100; ++x)
{
    B[x] = A[x] + 1;
    *C = x + 1;
}
```

In some embodiments, CheckHazard instructions are themselves predicated. Thus, a predicate vector may be passed-in, indicating which elements should be processed by the CheckHazard instruction. If the predicate bit corresponding to a particular element is inactive, that element is not considered in the memory-hazard checking process.

In some embodiments, the CheckHazard instruction may return stop indicators for each element in a first vector that indicate which element in a second vector presents a memory hazard against it. This information facilitates the optimal combination of stop indicators from multiple CheckHazard iterations.

Consider the operations in the loop presented in Table 6, and the corresponding pseudo-code presented in Table 7 (which checks for memory hazards between B and C and/or between C and D). This example allows maximum parallelism in the presence of unknown memory-hazard conditions. In this case, it is assumed that the compiler is able to establish that there are no memory hazards between A[ ] and B/C/D. However, because memory hazards between elements of A[ ] are dynamic and data-dependent, these memory hazards cannot be resolved by the compiler.

TABLE 6

```
for (x=0; x<100; ++x)
{
    r = A[B[x]];
    A[C[x]] = A[D[x]] + r;
}
```

TABLE 7

| | |
|---|---|
| Loop0: | |
| Bx = Read B[x * VECLEN]; | // Load B,C,D vectors |
| Cx = Read C[x * VECLEN]; | // Gives indexes into A[ ] |
| Dx = Read D[x * VECLEN]; | |
| P1 = CheckHazardVR(Bx,Cx); | // Check B against C (R versus W) |
| Pa = 0; | |
| Pa = GeneratePredicates(P1,Pa); | // Generate active elements |
| Loop1: | // Active elements indicated by Pa |
| r = Pa:Read(A[Bx]); | // Read A per active elements of B |
| P2 = Pa:CheckHazardVR(Dx,Cx); | // Check D against C (R versus W) |
| Pb = 0; | |
| Pb = Pa:GeneratePredicates(P2,Pb); | // Generate active elements |
| Loop2: | // Constrained by Pa |
| temp = Pb:Read(A[Dx]); | // Following code predicated on Pb |
| temp = Pb:Add(temp,r); | |
| Pb:Write(A[Cx],temp); | |
| Pb = Pa:GeneratePredicates(P2,Pb); | // Additional elements of Pa? |
| jnz Loop2 | |
| Pa = GeneratePredicates(P1,Pa); | // Additional elements of vector |
| jnz Loop1 | |
| Adjust Index (x) | // Additional iterations of loop |
| Branch to Loop if necessary | |

Note that if there are no memory hazards between the elements of A[ ], Loop1 and Loop2 in Table 7 do not actually loop. Instead, the memory-hazard checking finds no memory hazards so the predicate vectors enable all elements. Thus, the only looping that occurs is over Loop0 in Table 7, which results in maximum efficiency.

In situations where there are memory hazards between elements of A[ ] referenced by C[ ] and D[ ], Loop1 will fall-through, and the read of A[B[x]] will remain a full-width operation. Thus, Loop2 will iterate in a manner that prevents incorrect behavior until the full vector is satisfied. Furthermore, in situations where there are memory hazards between elements of A[ ] referenced by B[ ] and C[ ], Loop1 will iterate with multiple partial-vectors. Note that if no memory hazards are found between C[ ] and D[ ] then Loop2 will not iterate. Instead, it will process the full partial width indicated by Pa. And in situations where there are also memory hazards between C[ ] and D[ ], the partial vector specified by Pa in Loop1 (satisfying memory hazards between B[ ] and C[ ]) may be further decomposed to accommodate memory hazards between C[ ] and D[ ] in Loop2, and specified in Pb).

Note that the construction in this example allows a macroscalar processor or microprocessor to adjust its parallelism to dynamic memory hazards on a case-by-case basis at run time, thus ensuring correctness while enabling maximum parallelism.

In some embodiments, the CheckHazard instructions may be extended to incorporate more than two items. These embodiments may be useful because the number of two-operand CheckHazard instructions required to cross-check N items for memory hazards varies as the order of N-squared. Furthermore, it is often possible for the potential for memory hazards to exist where there are actually no memory hazards. As a consequence, the extended CheckHazard instructions may also reduce the amount of overhead due to memory-hazard checking And the extended CheckHazard instructions may generate more efficient results in the presence of memory hazards than multiple instances or applications of the two-input version of this instruction. Note that in the discussion that follows, the instruction "CheckHazard" is intended to encompass all of the versions of CheckHazard instructions described herein.

Table 8 presents pseudo-code for a sequence of instructions. In some embodiments, these instructions are replaced by a 3-way memory-hazard check, i.e., the command P=CheckHazard(A,B,C).

TABLE 8

Figure 8:
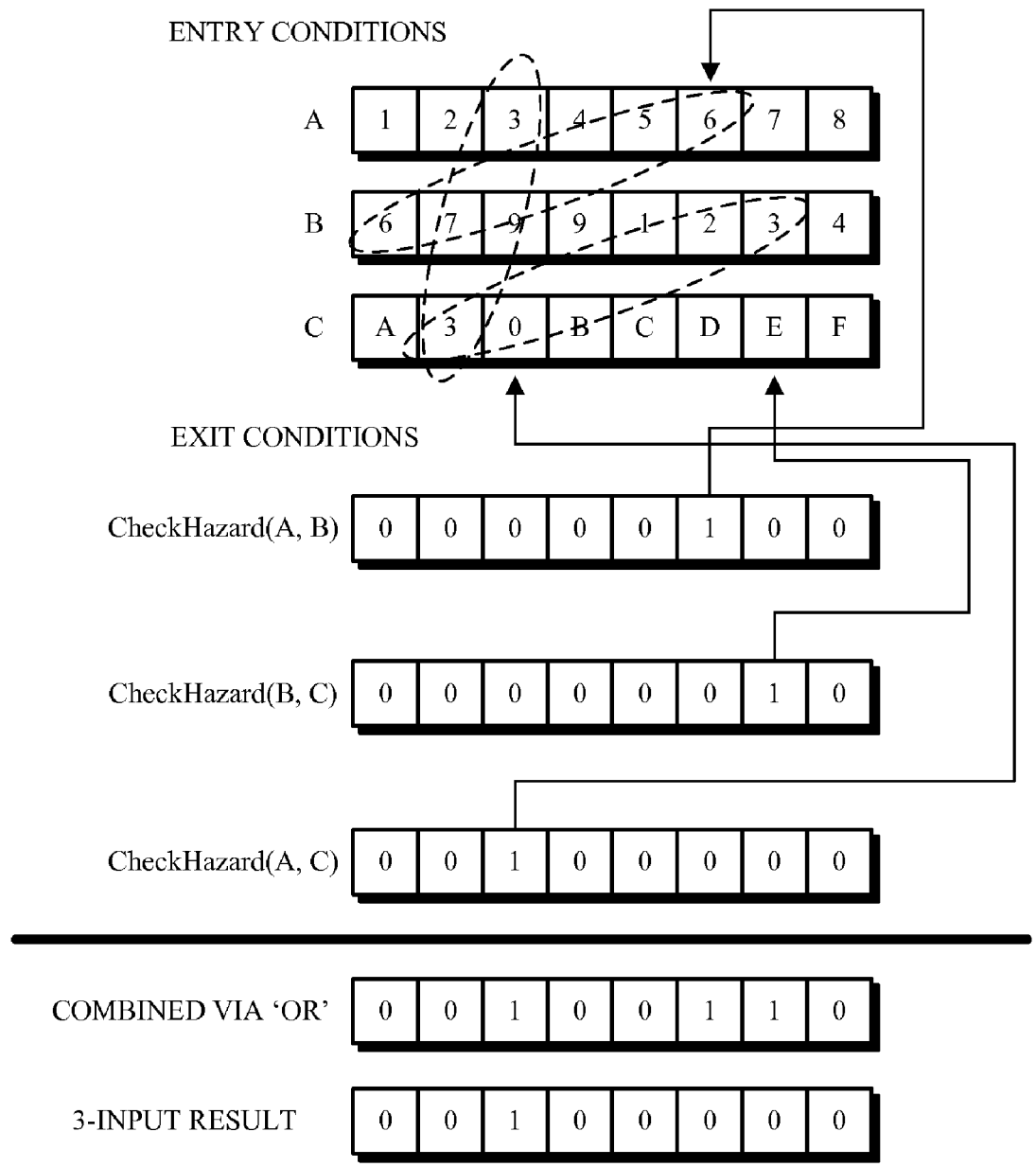
FIG. 8 illustrates the determination of stop indicators in accordance with an embodiment of the present invention.

P = CheckHazard(A,B);
P = P | CheckHazard(B,C);
P = P | CheckHazard(A,C);

As discussed previously, a break in parallelism may affect the criticality of subsequent memory hazards, sometimes rendering them benign. Because of this effect, a 3-input CheckHazard instruction has the potential to recognize more benign memory hazards than the 3-instruction code sequence shown in Table 8. This is illustrated in FIG. 8, which presents the determination of stop indicators in accordance with an embodiment of the present invention. Note that P1 determined by ORing the results obtained using 3-consecutive applications of CheckHazard has more stop indicators than P1 determined using a 3-input CheckHazard instruction. Thus, three sequential checks for memory hazards are combined in a way that that over-constrains parallelism because of the change in criticality of certain memory-hazard items is not recognized, while a 3-input memory-hazard check correctly handles benign memory hazards. In addition, note that P1 determined by ORing the results obtained using 3-consecutive applications of CheckHazard requires four passes over the body of the loop, while P1 determined using a 3-input CheckHazard instruction requires 2 passes over the body of the loop.

Note that it is possible to approximate the efficiency of the extended CheckHazard embodiments while checking fewer variables in parallel. In particular, it is possible to chain CheckHazard instructions together by passing the results of previous CheckHazard instructions as inputs to subsequent CheckHazard instructions, thereby allowing them to recognize previously-identified breaks in parallelism in the calculation of subsequent stop indicators. Furthermore, by combining previous results during the calculation, it is possible to eliminate the external combination.

This is illustrated in FIG. 9, which presents the determination of stop indicators in accordance with an embodiment of the present invention. In this embodiment, the predicate indicating a memory hazard from the (A, B) check is carried-forward. Even though this stop indicator becomes redundant after the check of (A, C), there is not enough data to identify this stop indicator as redundant, and so it carries forward. Note that the stop indicator normally set by the check of (B, C) may be identified as being redundant based on the stop indicator set by the check of (A, B). Also note that the three instructions may be executed in a single pass.

Instructions described in the preceding discussion generate predicate vectors that indicate which elements exhibit critical memory hazards. This result provides all the memory-hazard information for the complete vector width, and allows multiple passes to use this data without the need to recalculate the memory-hazard information. However, this data is not directly usable to enable/disable elements of the vector during processing, and thus a separate generate step is required to delineate which elements may safely be processed in parallel. Note that in the discussion that follows, a CheckHazard instruction for a partial vector is referred to as a CheckHazardGen instruction.

As discussed below, if one is willing to calculate memory-hazard information every pass, it is possible to return memory-hazard information for a partial vector that is formatted to be directly used by predicated instructions. In particular, the predicate used for the previous pass is included as an input to the CheckHazardGen instruction, allowing the instruction to determine the appropriate 'next' set of predicates. In this case, a null-predicate is used to indicate the first pass. Furthermore, the instruction sets a flag to indicate when processing of the vector is complete, i.e., no additional passes are required.

Consider the operations in the loop presented in Table 9 and the associated determination of stop indicators presented in FIG. 10. Note that each instance of the CheckHazardGen instruction is predicated on P, and that when P is a null set it indicates the end of passes for a given partial vector. Furthermore, the operations illustrated in FIG. 10 may be repeated for multiple vectors or partial vectors.

TABLE 9 for (x=0; x<100; ++x)
    A[C[x]] = A[B[x]] + 1;

Note that CheckHazardGen instruction may also be predicated, possibly to subject it to the requirements of enclosing CheckHazardGen instructions, in the manner described previously. Table 10 presents an example of operations in a loop and Table 11 presents corresponding pseudo-code.

TABLE 10 for (x=0; x<100; ++x)
{
    r = A[B[x]];
    A[C[x]] = A[D[x]] + r;
}

TABLE 11

```
Loop:
    Bx = Read B[x * VECLEN];          // Load B,C,D vectors
    Cx = Read C[x * VECLEN];          // (Indexes into A[ ])
    Dx = Read D[x * VECLEN];
    Pa = 0;
    Pa = CheckHazardGenVR(Pa,Bx,Cx);  // Check B vs C
Loop1:                                 // Active elements
                                       indicated by Pa
    r = Pa:Read(Bx);       // Read A (per Pa)
    Pb = 0;
    Pb = Pa:CheckHazardGenVR(Pb,Dx,Cx); // Check D vs C
Loop2:                                  // (Constrained by Pa)
    temp = Pb:Read(Dx);
    temp = Pb:Add(temp,r);
    Pb:Write(Cx,temp);
    Pb = Pa:CheckHazardGenVR(Pb,Cx,Dx); // Completed Pa?
    jnz Loop2
    Pa = CheckHazardGenVR(Pa,Bx,Cx);    // Completed vector?
    jnz Loop1
Adjust Index (x)                        // Additional loop
                                        iterations?
(Branch to Loop if necessary)
```

In some embodiments, CheckHazardGen is predicated (as illustrated in Table 11), or extended to check more than two inputs for memory hazards. Because CheckHazardGen makes no attempt to analyze memory hazards beyond the first critical memory-hazard identified in a given pass, chaining may be effectively accomplished by predicating the CheckHazardGen instructions in the chain based on the results of prior CheckHazardGen instructions.

Note that the pseudo-code illustrated in Tables 1-10 and exemplary embodiments illustrated in FIGS. 3-10 may include additional or fewer operations or data structures, positions of operations or data structures may be changed, and/or two or more operations or data structures may be combined.

Figure 11:
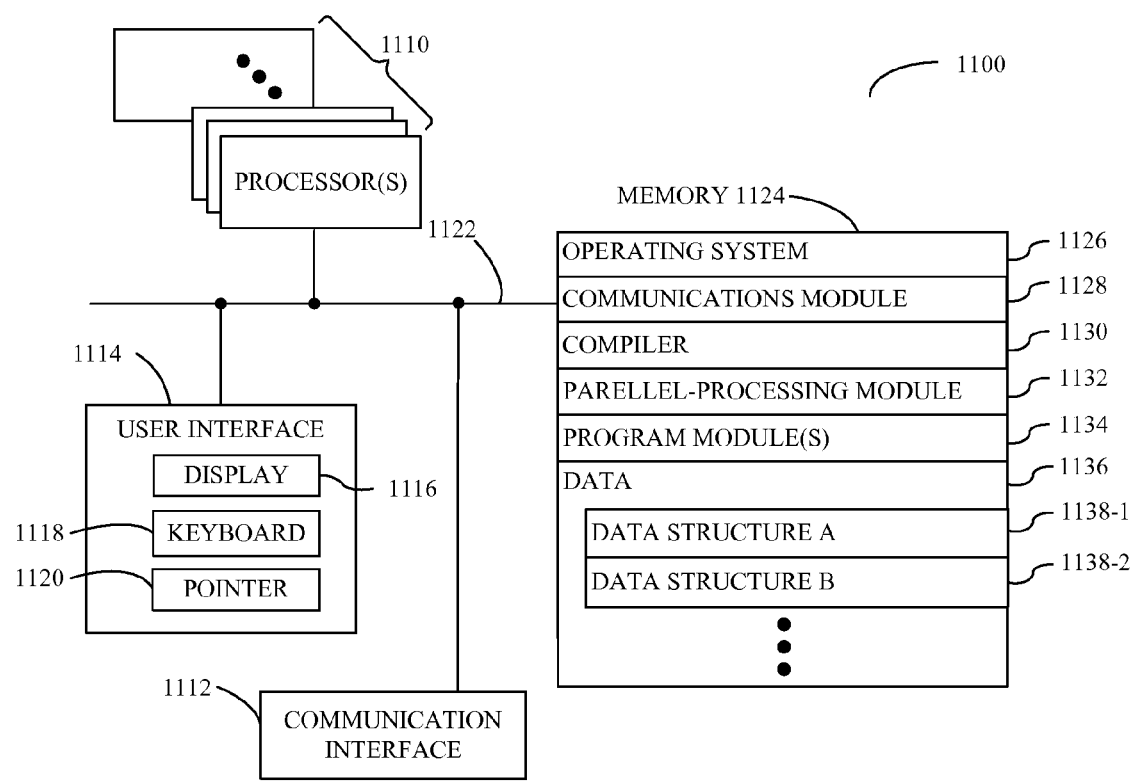
FIG. 11 is a block diagram illustrating a computer system in accordance with an embodiment of the present invention.

We now described computer systems that include compilers that generate instructions based on a feature set of a processor. FIG. 11 is a block diagram illustrating a computer system 1100 in accordance with an embodiment of the present invention. Computer system 1100 includes one or more processors 1110 or processor cores, a communication interface 1112, a user interface 1114, and one or more signal lines 1122 coupling these components together. Note that the one or more processors 1110 may support parallel processing and/or multi-threaded operation, the communication interface 1112 may have a persistent communication connection, and the one or more signal lines 1122 may constitute a communication bus. Moreover, the user interface 1114 may include a display 1116, a keyboard 1118, and/or a pointer 1120, such as a mouse.

Memory 1124 in the computer system 1100 may include volatile memory and/or non-volatile memory. More specifically, memory 1124 may include ROM, RAM, EPROM, EEPROM, FLASH, one or more smart cards, one or more magnetic disc storage devices, and/or one or more optical storage devices. Memory 1124 may store an operating system 1126 that includes procedures (or a set of instructions) for handling various basic system services for performing hardware dependent tasks. Memory 1124 may also store procedures (or a set of instructions) in a communication module 1128. The communication procedures may be used for communicating with one or more computers and/or servers, including computers and/or servers that are remotely located with respect to the computer system 1100.

Memory 1124 may include a compiler module 1130 (or a set of instructions) for generating instructions (such as program modules 1134) based on the feature set of the processors 1110. These instructions may be distributed to the processors 1110 for execution using parallel-processing module 1132 (or a set of instructions).

Memory 1124 may also include the program modules 1134 (or a set of instructions). Furthermore, memory 1124 may include data 1136, such as data structures 1138.

Instructions in the various modules in the memory 1124 may be implemented in a high-level procedural language, an object-oriented programming language, and/or in an assembly or machine language. The programming language may be compiled or interpreted, i.e, configurable or configured to be executed by the one or more processors 1110.

Although the computer system 1100 is illustrated as having a number of discrete items, FIG. 11 is intended to be a functional description of the various features that may be present in the computer system 1100 rather than as a structural schematic of the embodiments described herein. In practice, and as recognized by those of ordinary skill in the art, the functions of the computer system 1100 may be distributed over a large number of servers or computers, with various groups of the servers or computers performing particular subsets of the functions. In some embodiments, some or all of the functionality of the computer system 1100 may be implemented in one or more ASICs and/or one or more digital signal processors DSPs.

Computer system 1100 may include fewer components or additional components, two or more components may be combined into a single component, and/or a position of one or more components may be changed. In some embodiments the functionality of the computer system 1100 may be implemented more in hardware and less in software, or less in hardware and more in software, as is known in the art.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting memory hazards, comprising:
   while executing program code using a processor,
       executing one or more instructions to compute memory address information, wherein computing the memory address information comprises computing the memory address information using input data that is not available until runtime;
       writing the memory address information to corresponding elements in a plurality of vectors; and
       executing a memory-hazard-checking instruction to determine a portion of the elements of at least one of the vectors for which performing corresponding memory operations in parallel using the memory address information will not result in an error.

2. The method of claim 1, wherein the method further comprises:
   performing memory operations in parallel using the memory address information in the portion of the elements.

3. The method of claim 2, wherein the method further comprises:
   as long as the memory operations have not yet been performed using the memory address information in one or more elements in the at least one of the vectors:
       re-executing the memory-hazard checking instruction to determine a next portion of elements of the at least one of the vectors for which performing corresponding memory operations in parallel using the memory address information will not result in the error; and performing memory-accessing operations using the memory address information in the next portion of the elements in parallel.

4. The method of claim 1, wherein computing the memory address information using input data that is not available until runtime comprises using input data that was unavailable during a compilation operation during which the program code was generated.

5. The method of claim 1, wherein the method further comprises:

using at least one predicate vector to determine elements that are to be checked when determining the portion of the elements of the at least one of the vectors.

6. The method of claim 1, wherein determining the portion of the elements of the at least one of the vectors comprises:

comparing one or more elements of the at least one of the vectors to a value in a scalar variable.

7. The method of claim 6, wherein the method further comprises:

copying the value from the scalar variable into each element of a comparison vector; and comparing at least one element of the at least one of the vectors to a corresponding element in the comparison vector.

8. The method of claim 1, wherein the memory address information comprises at least one of:

memory addresses;
indexes; or
pointers.

9. An apparatus for detecting memory hazards, comprising:

a processor that is configured to, while executing program code:

execute one or more instructions to compute memory address information, wherein, when computing the memory address information, the processor is configured to compute the memory address information using input data that is not available until runtime;

write the memory address information to corresponding elements in a plurality of vectors; and execute a memory-hazard-checking instruction to determine a portion of the elements of at least one of the vectors for which performing corresponding memory operations in parallel using the memory address information will not result in an error.

10. The apparatus of claim 9, wherein the processor is further configured to:

perform memory operations in parallel using the memory address information in the portion of the elements.

11. The apparatus of claim 10, wherein the processor is further configured to:

as long as the memory operations have not yet been performed using the memory address information in one or more elements in the at least one of the vectors:

re-execute the memory-hazard checking instruction to determine a next portion of elements of the at least one of the vectors for which performing corresponding memory operations in parallel using the memory address information will not result in the error; and perform memory-accessing operations using the memory address information in the next portion of the elements in parallel.

12. The apparatus of claim 9, wherein, when computing the memory address information using input data that is not available until runtime, the processor is configured to use input data that was unavailable during a compilation operation during which the program code was generated.

13. The apparatus of claim 9, wherein the processor is further configured to:

use at least one predicate vector to determine elements that are to be checked when determining the portion of the elements of the at least one of the vectors.

14. The apparatus of claim 9, wherein, when determining the portion of the elements of the at least one of the vectors, the processor is configured to:

compare one or more elements of the at least one of the vectors to a value in a scalar variable.

15. The apparatus of claim 14, wherein the processor is further configured to:

copy the value from the scalar variable into each element of a comparison vector; and compare at least one element of the at least one of the vectors to a corresponding element in the comparison vector.

16. The apparatus of claim 9, wherein the memory address information comprises at least one of:

memory addresses;
indexes; or
pointers.

17. A computer system for detecting memory hazards, comprising:

a processor;

a memory coupled to the processor, wherein the memory stores instructions and data for the processor;

wherein the processor is configured to, while executing program code:

execute one or more instructions to compute memory address information, wherein, when computing the memory address information, the processor is configured to compute the memory address information using input data that is not available until runtime;

write the memory address information to corresponding elements in a plurality of vectors; and execute a memory-hazard-checking instruction to determine a portion of the elements of at least one of the vectors for which performing corresponding memory operations in parallel using the memory address information will not result in an error.

18. The computer system of claim 17, wherein the processor is further configured to:

perform memory operations in parallel using the memory address information in the portion of the elements.

19. The computer system of claim 18, wherein the processor is further configured to:

as long as the memory operations have not yet been performed using the memory address information in one or more elements in the at least one of the vectors:

re-execute the memory-hazard checking instruction to determine a next portion of elements of the at least one of the vectors for which performing corresponding memory operations in parallel using the memory address information will not result in the error; and perform memory-accessing operations using the memory address information in the next portion of the elements in parallel.

20. The computer system of claim 17, wherein, when computing the memory address information using input data that is not available until runtime, the processor is configured to use input data that was unavailable during a compilation operation during which the program code was generated.

21. The computer system of claim 17, wherein the processor is further configured to:
 use at least one predicate vector to determine elements that are to be checked when determining the portion of the elements of the at least one of the vectors.

22. The computer system of claim 17, wherein, when determining the portion of the elements of the at least one of the vectors, the processor is configured to:
 compare one or more elements of the at least one of the vectors to a value in a scalar variable.

23. The computer system of claim 22, wherein the processor is further configured to:
 copy the value from the scalar variable into each element of a comparison vector; and
 compare at least one element of the at least one of the vectors to a corresponding element in the comparison vector.

24. The computer system of claim 17, wherein the memory address information comprises at least one of:
 memory addresses;
 indexes; or
 pointers.

* * * * *